US012713358B2

(12) United States Patent
Wang et al.

(10) Patent No.: US 12,713,358 B2
(45) Date of Patent: Aug. 18, 2026

(54) DOWNLINK POWER CONTROL METHOD AND APPARATUS

(71) Applicant: HUAWEI TECHNOLOGIES CO., LTD., Shenzhen (CN)

(72) Inventors: Man Wang, Shanghai (CN); Jian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 18/591,027

(22) Filed: Feb. 29, 2024

(65) Prior Publication Data

US 2024/0205835 A1 Jun. 20, 2024

Related U.S. Application Data

(63) Continuation of application No. PCT/CN2022/113636, filed on Aug. 19, 2022.

(30) Foreign Application Priority Data

Aug. 31, 2021 (CN) ......................... 202111015747.0

(51) Int. Cl.
*H04W 52/14* (2009.01)
*H04W 52/24* (2009.01)
(Continued)

(52) U.S. Cl.
CPC ....... *H04W 52/143* (2013.01); *H04W 52/245* (2013.01); *H04W 52/367* (2013.01); *H04W 56/0045* (2013.01)

(58) Field of Classification Search
CPC ............. H04W 52/143; H04W 52/245; H04W 52/367; H04W 56/0045
See application file for complete search history.

(56) References Cited

U.S. PATENT DOCUMENTS 9,775,121 B1 * 9/2017 Cai ........................ H04L 5/0048

FOREIGN PATENT DOCUMENTS

CN 101772143 A 7/2010
CN 102711182 A 10/2012
(Continued)

OTHER PUBLICATIONS

3GPP TS 28.310 V16.5.0 (Jun. 2021) 3rd Generation Partnership Project;Technical Specification Group Services and System Aspects;Management and orchestration;Energy efficiency of 5G (Release 16),total 26 pages.
(Continued)

*Primary Examiner* — Won Tae C Kim
(74) *Attorney, Agent, or Firm* — HAUPTMAN HAM, LLP

(57) ABSTRACT

A downlink power control method and an apparatus. A network management node determines a low energy consumption area, where the low energy consumption area is an area that is within signal coverage of a network node and whose communication distance from the network node is greater than a first preset distance. The network management node generates a power control policy, where the power control policy is used to control the network node to reduce energy consumption for the low energy consumption area, and the network node executes the power control policy to save energy. Energy saving is performed based on loads of some areas in a cell, to maximize an energy efficiency gain.

19 Claims, 8 Drawing Sheets

(51) Int. Cl.
*H04W 52/36* (2009.01)
*H04W 56/00* (2009.01)

(56) References Cited

FOREIGN PATENT DOCUMENTS

| | | | |
|---|---|---|---|
| CN | 103916946 | A | 7/2014 |
| EP | 2355594 | A1 | 8/2011 |
| FR | 3013936 | A1 | 5/2015 |

OTHER PUBLICATIONS

3GPP TS 28.104 V0.0.0 (Apr. 2021) 3rd Generation Partnership Project;Technical Specification Group Services and System Aspects;Management and orchestration;Management Data Analytics (MDA) (Release 17),total 7 pages.

3GPP TS 28.552 V16. 10.0 (Jun. 2021) 3rd Generation Partnership Project;Technical Specification Group Services and System Aspects;Management and orchestration;5G performance measurements (Release 16),total 196 pages.

3GPP TS 26.247 V16.4.1 (Oct. 2020) 3rd Generation Partnership Project;Technical Specification Group Services and System Aspects;Transparent end-to-end Packet-switched Streaming Service (PSS);Progressive Download and Dynamic Adaptive Streaming over http (3GP-DASH) (Release 16),total 140 pages.

3GPP TS 26.114 V17.1.0 (Jun. 2021) 3rd Generation Partnership Project;Technical Specification Group Services and System Aspects;IP Multimedia Subsystem (IMS);Multimedia Telephony;Media handling and interaction (Release 17),total 468 pages.

3GPP TS 28.406 V16.0.0 (Jul. 2020) 3rd Generation Partnership Project;Technical Specification Group Services and System Aspects; elecommunication management;Quality of Experience (QoE) measurement collection;Information definition and transport (Release 16),total 10 pages.

3GPP TS 28.541 V17.3.0 (Jun. 2021) 3rd Generation Partnership Project;Technical Specification Group Services and System Aspects;Management and orchestration;5G Network Resource Model (NRM);Stage 2 and stage 3 (Release 17 ),total 459 pages.

International Search Report issued in corresponding International Application No. PCT/CN2022/113636, dated Nov. 18, 2022, pp. 1-10.

Partial Supplementary European Search Report issued in corresponding European Application No. 22863184.2, dated Oct. 28, 2024, pp. 1-16.

An Energy Efficient Power Control Mechanismfor Base Stations in Mobile Communication Systems, Seung Hwan Lee Yonghoon Choi, 10.1109/ICOIN.2011.5723132, Jan. 26-28, 2011, total 6 pages.

Extended European Search Report issued in corresponding European Application No. 22863184.2, dated Jan. 23, 2025, pp. 1-14.

* cited by examiner

First preset distance
P
S1
L × P%

DOWNLINK POWER CONTROL METHOD AND APPARATUS

CROSS-REFERENCE TO RELATED APPLICATIONS

This application is a continuation of International Patent Application No. PCT/CN2022/113636, filed on Aug. 19, 2022 which claims priority to Chinese Patent Application No. 202111015747.0, filed on Aug. 31, 2021. The disclosures of the aforementioned applications are hereby incorporated by reference in their entireties.

BACKGROUND

The bandwidth of the 5th generation mobile communication technology (5th generation mobile communication technology, 5G) is more than five times that of the 4th generation mobile information system (4th generation mobile communication technology, 4G). In addition, the application of technologies such as massive (massive) multiple-in multiple-out (multiple-in multiple-out, MIMO) greatly increases energy consumption of 5G base stations compared with 4G base stations. Reducing the energy consumption of the 5G base stations has always been a key concern for operators in 5G network operation. The operators continuously work out effective measures for energy consumption reduction to cut the costs of 5G network operation, and contribute to environmental protection and sustainable development of the earth.

In some cases, whether a cell enters an energy saving state is determined based on loads of the entire cell, to reduce energy consumption of a base station. However, the loads of the cell are unevenly distributed in space. In this case, determining, based on the loads of the entire cell, whether to control the cell to enter the energy saving state makes energy saving state control inflexible and cannot maximize an energy efficiency gain.

SUMMARY

Embodiments described herein provide a downlink power control method and an apparatus, to save energy based on loads of some areas in a cell in response to load space distribution in the cell being uneven, to maximize an energy efficiency gain.

According to a first aspect, a downlink power control method is provided, where the method includes: determining a low energy consumption area, where the low energy consumption area is an area whose communication distance from a network node is greater than a first preset distance; generating a power control policy, where the power control policy is used to control the network node to reduce energy consumption for the low energy consumption area; and sending the power control policy.

In at least one embodiment, the low energy consumption area far away from the network node is determined, and the power control policy for the low energy consumption area is generated, so that the network node reduces energy consumption for the low energy consumption area, and thereby saves energy based on loads of the low energy consumption area and maximizes an energy efficiency gain.

In an optional example, before the determining a low energy consumption area, the method further includes: obtaining information related to first communication between the network node and at least one terminal device, where the at least one terminal device is a terminal device that receives a downlink signal of the network node; determining a communication distance between the network node and the at least one terminal device based on the information related to the communication between the network node and the at least one terminal device; and determining the first preset distance based on the communication distance between the network node and the at least one terminal device.

In an optional example, the information related to the first communication includes a timing advance TA of a terminal device that communicates with the network node, first positioning information of the terminal device, or terminal measurement information for communication between the terminal device and the network node. The terminal measurement information includes reference signal received power RSRP, reference signal received quality RSRQ, a signal-to-interference-plus-noise ratio SINR, and/or second positioning information of the terminal device.

In an optional example, the determining a communication distance between the network node and the at least one terminal device based on the information related to the communication between the network node and the at least one terminal device includes: determining a relative distance between the network node and the terminal device based on the TA of the terminal device that communicates with the network node, and determining the communication distance between the network node and the terminal device based on the relative distance; or determining communication signal strength between the network node and the terminal device based on signal strength-related information in the terminal measurement information for communication between the terminal device and the network node, and determining the communication distance between the network node and the terminal device based on the communication signal strength, where the signal strength-related information includes the RSRP, the RSRQ, and/or the SINR; or determining a location of the terminal device based on positioning information of the terminal device, and determining the communication distance between the terminal device and the network node based on the location of the terminal device, where the positioning information includes the first positioning information or the second positioning information.

In at least one embodiment, the communication distance between the network node and the terminal device is determined by obtaining the information related to the first communication between the network node and the terminal device, and then the low energy consumption area far away from the network node is determined based on the communication distance, so that the determined low energy consumption area is better targeted in a real-time manner, and the generated power control policy maximizes an energy efficiency gain through power control of the network node.

In an optional example, before the generating a power control policy, the method further includes: obtaining information related to second communication between the network node and at least one terminal device; determining, based on the information related to the second communication, that a quantity of terminal devices in the low energy consumption area is less than a first preset quantity, or determining, based on the information related to the second communication, that traffic in the low energy consumption area is less than first preset traffic.

In an optional example, the information related to the second communication includes first positioning information of the at least one terminal device, or terminal measurement information for communication between the at least one terminal device and the network node, or the information related to the second communication further includes throughput information of the at least one terminal device.

In an optional example, the determining, based on the information related to the second communication, that a quantity of terminal devices in the low energy consumption area is less than a first preset quantity includes: determining a location of the at least one terminal device based on the first positioning information of the at least one terminal device or the terminal measurement information for communication between the at least one terminal device and the network node, and determining, based on the location of the at least one terminal device, whether the quantity of terminal devices in the low energy consumption area is less than the first preset quantity. The determining, based on the information related to the second communication between the network node and the at least one terminal device, that traffic in the low energy consumption area is less than first preset traffic includes: determining the location of the at least one terminal device based on the first positioning information of the at least one terminal device or the terminal measurement information for communication between the at least one terminal device and the network node, and determining, based on a throughput of the at least one terminal device, whether traffic of the terminal device in the low energy consumption area is less than the first preset traffic.

In at least one embodiment, after the low energy consumption area whose communication distance from the network node is greater than the first preset distance is determined, the quantity of terminal devices in the low energy consumption area is less than the first preset quantity, or distributed traffic of terminal devices in the low energy consumption area is determined to be is less than the first preset traffic. In this way, in response to the power control policy being configured to control the network node to reduce energy consumption for the low energy consumption area, energy is saved for a case in which load space distribution in a cell is uneven, while ensuring fewer terminal devices accessing the network node are affected and improving feasibility of energy saving.

In an optional example, the low energy consumption area is a low energy consumption area in a target time period, and that the power control policy is used to control the network node to reduce energy consumption for the low energy consumption area includes: The power control policy is used to control the network node to reduce energy consumption for the low energy consumption area in the target time period.

In an optional example, the power control policy includes: down-regulating transmit power of the network node.

In an optional example, the power control policy includes: performing communication link rollback processing on the network node.

Power consumption of the network node is reduced by generating the power control policy to control the network node. In response to the transmit power of the network node being down-regulated, the power control policy is applicable to all terminal devices within signal coverage of the network node, without affecting communication between the network node and a terminal device that is not in the low energy consumption area. In response to communication link rollback being performed, the power control policy is applicable only to the terminal device in the low energy consumption area, and communication with a terminal device that is not in the low energy consumption area is not affected. Therefore, the power control policy specified in at least one embodiment is used to save energy based on loads of some areas in a cell, to maximize an energy efficiency gain.

In an optional example, the method further includes: generating first indication information, where the first indication information indicates to hand over a first terminal device to an auxiliary network node, and the first terminal device is a terminal device in the low energy consumption area; and sending the first indication information to the network node.

In at least one embodiment, after the power control policy for the first terminal device in the low energy consumption area is generated, the first indication information is generated to indicate to hand over the first terminal device to the auxiliary network node, so that in response to the network node failing to provide a good communication service for the first terminal device after power consumption reduction, the first terminal device is handed over to another network node for access and communication. This process reduces impact of energy saving of the network node on communication of the terminal device, and ensures communication of the terminal device in the low power consumption area.

In an optional example, the method further includes: generating second indication information, where the second indication information indicates the network node to increase transmit power for the first terminal device, and the first terminal device is the terminal device in the low energy consumption area; and sending the second indication information to the network node.

In an optional example, the increasing transmit power for the first terminal device includes: increasing a quantity of resource blocks allocated to the first terminal device and/or increasing resource block power allocated to the first terminal device.

In at least one embodiment, after the power control policy for the first terminal device in the low energy consumption area is generated, the second indication information is generated to indicate the network node to increase the transmit power for the first terminal device, so that after coverage of the cell corresponding to the network node is reduced due to the communication link rollback of the network node, power aggregation and user-level power control are used to make up for lost coverage of the cell. This process reduces impact of energy saving of the network node on communication of the terminal device, and ensures communication of a network device in the low power consumption area.

In an optional example, the signal coverage of the network node includes signal coverage of a cell corresponding to the network node.

According to a second aspect, a downlink power control method is provided and applied to a network node. The method includes:

receiving a power control policy, where the power control policy is used to control the network node to reduce energy consumption for a low energy consumption area, and the low energy consumption area is an area that is within signal coverage of the network node and whose communication distance from the network node is greater than a first preset distance; and executing the power control policy.

In an optional example, before the receiving the power control policy, the method further includes: sending information related to first communication between the network node and at least one terminal device to a network management node, where the at least one terminal device is a terminal device that receives a downlink signal of the network node, and the information related to the first communication is used by the network management node to determine the first preset distance.

In an optional example, the information related to the first communication includes a timing advance TA of a terminal device that communicates with the network node, first positioning information of the terminal device, or terminal measurement information for communication between the terminal device and the network node. The terminal measurement information includes reference signal received power RSRP, reference signal received quality RSRQ, a signal-to-interference-plus-noise ratio SINR, and/or second positioning information of the terminal device.

In an optional example, before the receiving a power control policy, the method further includes: sending information related to second communication between the network node and at least one terminal device to the network management node, where the information related to the second communication is used by the network management node to determine that a quantity of terminal devices in the low energy consumption area is less than a first preset quantity, or determine that traffic in the low energy consumption area is less than first preset traffic.

In an optional example, the information related to the second communication includes first positioning information of the at least one terminal device, or terminal measurement information for communication between the at least one terminal device and the network node, or the information related to the second communication further includes throughput information of the at least one terminal device.

In an optional example, the power control policy includes: down-regulating transmit power of the network node.

In an optional example, the power control policy includes: performing communication link rollback processing on the network node.

In an optional example, the method further includes: receiving first indication information, where the first indication information indicates to hand over a first terminal device to an auxiliary network node; and performing an operation indicated by the first indication information.

In an optional example, the method further includes: receiving second indication information, where the second indication information indicates the network node to increase transmit power for the first terminal device; and performing an operation indicated by the second indication information.

In an optional example, the increasing transmit power for the first terminal device includes: increasing a quantity of resource blocks allocated to the first terminal device and/or increasing resource block power allocated to the first terminal device.

According to a third aspect, a communication apparatus is provided. The apparatus includes: a processing module, configured to determine that a low energy consumption area is an area that is within signal coverage of a network node and whose communication distance from the network node is greater than a first preset distance, and generate a power control policy, where the power control policy is used to control the network node to reduce energy consumption for the low energy consumption area; and a sending module, configured to send the power control policy to the network node.

In an optional example, the apparatus further includes a receiving module. The receiving module is configured to obtain information related to first communication between the network node and at least one terminal device, where the at least one terminal device is a terminal device that receives a downlink signal of the network node. The processing module is further configured to determine a communication distance between the network node and the at least one terminal device based on the information related to the communication between the network node and the at least one terminal device, and determine the first preset distance based on the communication distance between the network node and the at least one terminal device.

In an optional example, the apparatus further includes the receiving module. The receiving module is configured to obtain information related to second communication between the network node and at least one terminal device. The processing module is further configured to determine, based on the information related to the second communication, that a quantity of terminal devices in the low energy consumption area is less than a first preset quantity, or determine, based on the information related to the second communication, that traffic in the low energy consumption area is less than first preset traffic.

In an optional example, the processing module is further configured to generate first indication information, where the first indication information indicates to hand over a first terminal device to an auxiliary network node, and the first terminal device is a terminal device in the low energy consumption area. The sending module is further configured to send the first indication information to the network node.

In an optional example, the processing module is further configured to generate second indication information, where the second indication information indicates the network node to increase transmit power for a first terminal device, and the first terminal device is a terminal device in the low energy consumption area. The sending module is further configured to send the second indication information to the network node.

According to a fourth aspect, a communication apparatus is provided. The apparatus includes: a receiving module, configured to receive a power control policy, where the power control policy is used to control a network node to reduce energy consumption for a low energy consumption area, and the low energy consumption area is an area that is within signal coverage of the network node and whose communication distance from the network node is greater than a first preset distance; and a processing module, configured to execute the power control policy.

In an optional example, the apparatus further includes a sending module, configured to send information related to first communication between the network node and at least one terminal device to a network management node, where the at least one terminal device is a terminal device that receives a downlink signal of the network node, and the information related to the first communication is used by the network management node to determine the first preset distance.

In an optional example, the apparatus further includes the sending module, configured to send information related to second communication between the network node and at least one terminal device to the network management node, where the information related to the second communication is used by the network management node to determine that a quantity of terminal devices in the low energy consumption area is less than a first preset quantity, or determine that traffic in the low energy consumption area is less than first preset traffic.

In an optional example, the receiving module is further configured to receive first indication information, where the first indication information indicates to hand over a first terminal device to an auxiliary network node. The processing module is further configured to execute the first indication information.

In an optional example, the receiving module is further configured to receive second indication information, where the second indication information indicates the network node to increase transmit power for a first terminal device. The processing module is further configured to execute the second indication information.

According to a fifth aspect, at least one embodiment provides a communication apparatus. The apparatus includes a communication interface and at least one processor, where the communication interface is used by the apparatus to communicate with another device. For example, the communication interface is a transceiver, a circuit, a bus, a module, or another type of communication interface. The at least one processor is configured to invoke a group of programs, instructions, or data to perform the method according to the first aspect or the second aspect. The apparatus further includes a memory, configured to store the programs, instructions, or data invoked by the processor. The memory is coupled to the at least one processor. In response to executing the instructions or data stored in the memory, the at least one processor implements the method according to the first aspect or the second aspect.

According to a sixth aspect, at least one embodiment further provides a computer-readable storage medium. The computer-readable storage medium stores instructions, and in response to the instructions being run on a computer, the computer is enabled to perform the method according to the first aspect or any implementation in the first aspect, or perform the method according to the second aspect or any implementation in the second aspect.

According to a seventh aspect, at least one embodiment provides a chip system. The chip system includes a processor, and further includes a memory. The chip system is configured to implement the method according to the first aspect or any implementation in the first aspect, or configured to implement the method according to the second aspect or any implementation in the second aspect. The chip system includes a chip, or includes a chip and another discrete device.

In at least one embodiment, the chip system further includes a transceiver.

According to an eighth aspect, at least one embodiment further provides a computer program product, including instructions. In response to the computer program product running on a computer, the computer is enabled to perform the method according to the first aspect or any implementation in the first aspect, or perform the method according to the second aspect or any implementation in the second aspect.

According to a ninth aspect, at least one embodiment further provides a communication system. The communication system includes the communication apparatuses provided in the first aspect and the second aspect.

BRIEF DESCRIPTION OF DRAWINGS

To describe technical solutions of embodiments described herein more clearly, the following briefly describes the accompanying drawings used in the embodiments.

DESCRIPTION OF EMBODIMENTS

Figure 1:
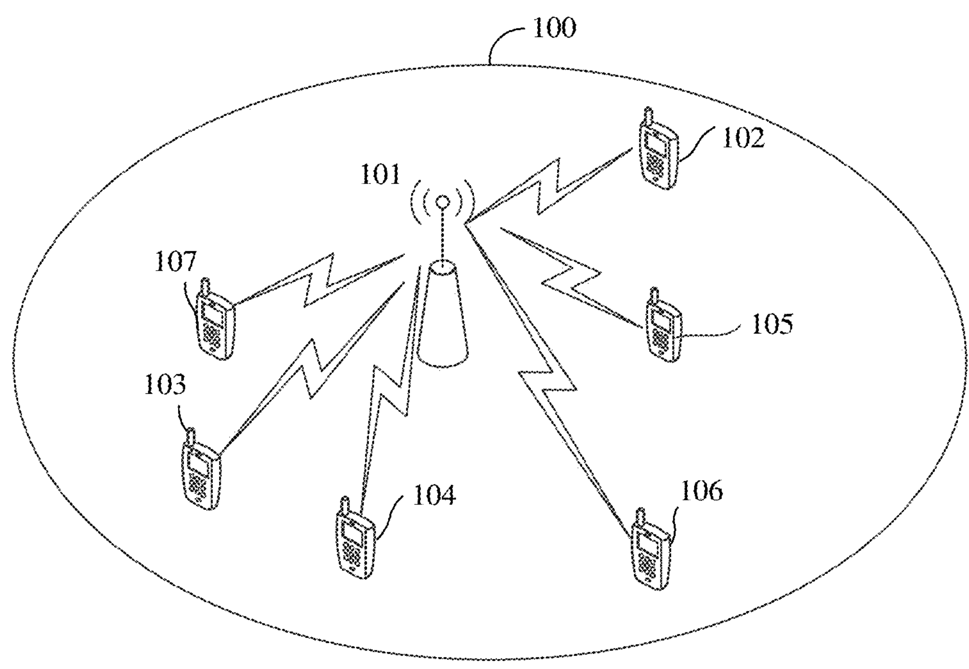
FIG. 1 is a schematic diagram of a structure of a communication system according to at least one embodiment.

In embodiments described herein, claims, and accompanying drawings, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or modules is not limited to the listed steps or modules, but optionally further includes an unlisted step or module, or optionally further includes another inherent step or module of the process, the method, the product, or the device.

An "embodiment" mentioned herein means that a particular feature, structure, or characteristic described with reference to this embodiment is included in at least one embodiment. The phrase shown in various locations does not necessarily refer to a same embodiment, and is not an independent or optional embodiment exclusive from another embodiment. A person skilled in the art understands that an embodiment described herein is able to be combined with another embodiment.

"A plurality of" refers to two or more than two. "And/or" describes an association relationship between associated objects and represents that three relationships exist. For example, A and/or B represent the following three cases: Only A exists, both A and B exist, and only B exists. The character "/" generally indicates an "or" relationship between the associated objects.

An application scenario in at least one embodiment is described first.

Embodiments described herein are applied to a long term evolution (long term evolution, LTE) system and an internet of things (internet of things, IoT) system, or are applied to another wireless communication system, for example, a global system for mobile communications (global system for mobile communications, GSM), a universal mobile telecommunications system (universal mobile telecommunications system, UMTS), a code division multiple access (code division multiple access, CDMA) system, and a new radio (new radio, NR) system.

A terminal device in at least one embodiment is also referred to as a terminal, user equipment (user equipment, UE), a mobile station, a mobile terminal, or the like. The terminal is widely applied to various scenarios, for example, device-to-device (device-to-device, D2D), vehicle to everything (vehicle to everything, V2X) communication, machine-type communication (machine-type communication, MTC), internet of things (internet of things, IOT), virtual reality, augmented reality, industrial control, autonomous driving, telemedicine, smart grid, smart furniture, smart office, smart wearable devices, smart transportation, and smart city. The terminal is a mobile phone, a tablet computer, a computer with a wireless transceiver function, a wearable device, a vehicle, an unmanned aerial vehicle, a helicopter, an airplane, a ship, a robot, a robot arm, a smart home device, or the like. A specific technology and a specific device form used by the terminal are not limited in at least one embodiment. A network device in at least one embodiment is also referred to as a radio access network device. The network device is a base station (base station), an evolved NodeB (evolved NodeB, eNodeB), a transmission reception point (transmission reception point, TRP), a next generation NodeB (next generation NodeB, gNB) in a 5th generation (5th generation, 5G) mobile communication system, a next generation NodeB in a 6th generation (6th generation, 6G) mobile communication system, a base station in a future mobile communication system, an access node in a Wi-Fi system, or the like. The network device is further a module or unit that completes some functions of the base station, for example, is a central unit (central unit, CU), or is a distributed unit (distributed unit, DU). The CU completes functions of a radio resource control protocol and a packet data convergence protocol (packet data convergence protocol, PDCP) of the base station, and further completes a function of a service data adaptation protocol (service data adaptation protocol, SDAP). The DU completes functions of a radio link control layer and a medium access control (medium access control, MAC) layer of the base station, and further completes a function of some or all physical layers. For specific descriptions of the foregoing protocol layers, refer to related technical specifications of a 3rd generation partnership project (3rd generation partnership project, 3GPP). The network device is a macro base station, or is a micro base station or an indoor base station, or is a relay node, a donor node, or the like. A specific technology and a specific device form that are used by the network device are not limited in at least one embodiment.

In at least one embodiment, the network device is represented as a network node, and the form in which the network device is represented is not limited.

For a system structure of the terminal device and the network node, refer to FIG. 1. FIG. 1 is a schematic diagram of a structure of a communication system according to at least one embodiment. As shown in FIG. 1, the system includes one network node 101 and six terminal devices, and the six terminal devices are respectively a terminal device 102 to a terminal device 107.

Figure 2:
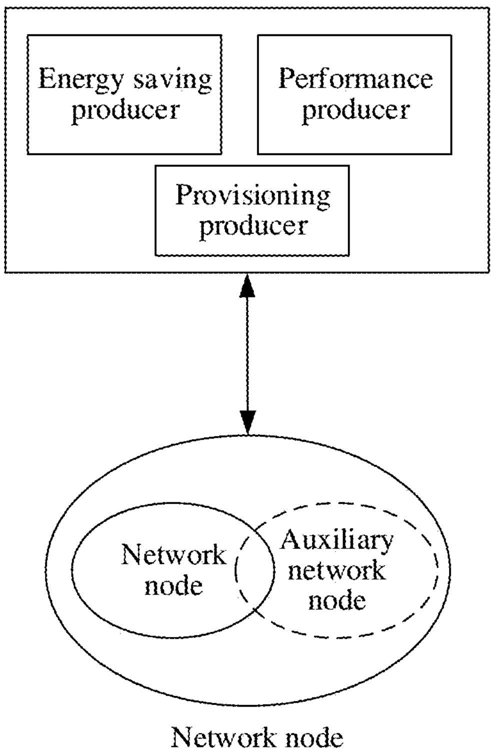
FIG. 2 is a schematic diagram of another communication system according to at least one embodiment.

In addition, FIG. 2 is a schematic diagram of another communication system according to at least one embodiment. As shown in FIG. 2, the communication system includes a network management node and a network node. The network management node includes an energy saving producer, a performance producer, and a provisioning producer, and the three producers communicate with one another by using interconnected interfaces. The energy saving producer invokes a service of the performance producer, that is, receive information that is sent by the performance producer and that is from a network device. An energy saving policy and an energy saving feature enabling command that are delivered by the energy saving producer are delivered by the provisioning producer to the network device. Each of the energy saving producer, the performance producer, and the provisioning producer correspond to a different network element, or all the three producers or any two thereof correspond to one network element, that is, the three producers are a plurality of virtual functional modules in the one network element, or are three independent network elements. The network node in the figure is the network device, and the network device is a base station. A form of the base station is not limited, for example, a macro base station and a micro base station in a macro-micro base station scenario, and a central unit (central Unit, CU) and distributed unit (distributed Unit, DU) separation scenario in a cloud radio access network (cloud radio access network, C-RAN). In the CU-DU separation scenario, the network device includes both the CU and the DU, or includes the DU alone. A base station includes one or more cells (cells).

In addition, terms that are used in at least one embodiment are explained.

An energy saving producer (energy saving producer) is a provider of energy saving services on a management plane. The energy saving producer provides energy saving-related services and manages energy saving features of a network node.

A performance producer (performance producer) is a provider of performance-related services on a management plane. The performance producer collects and provides performance parameters of network entities for other network administrators. The performance-related services are, for example, statistics of energy consumption of a network node resource in a time period, statistics of a throughput of a network node in a time period, and prediction of energy consumption and a throughput of a network node in a future time period. The performance parameters are, for example, energy consumption (of a network node), a packet transmission delay, physical resource utilization, and a throughput of a cell (network node).

A provisioning producer (provisioning producer) is a provider of provisioning-related services on a management plane. The provisioning producer mainly provides provisioning, ending, modification, and the like of various services in a network.

An energy saving network node (energy saving network node) is a network node corresponding to an energy saving cell. In response to a specific condition being met, for example, a cell bears a low load, the network node corresponding to the energy saving cell enables some energy saving features to achieve an objective of energy saving. A network node that performs the method provided in at least one embodiment is an energy saving network node.

A secondary network node (secondary network node) is a network device corresponding to a supplementary cell. In response to an energy saving cell being closed or coverage of the energy saving cell decreasing, a UE that is in the energy saving cell and that cannot communicate normally or whose communication quality deteriorates is handed over to the supplementary cell.

In the description of the following embodiments, the foregoing network device is described as a network node. The network node corresponds to one or more cells. In at least one embodiment, an example in which one network node corresponds to one cell is used for description. In addition, a terminal device is represented by a UE.

Figures 3A, 3B:
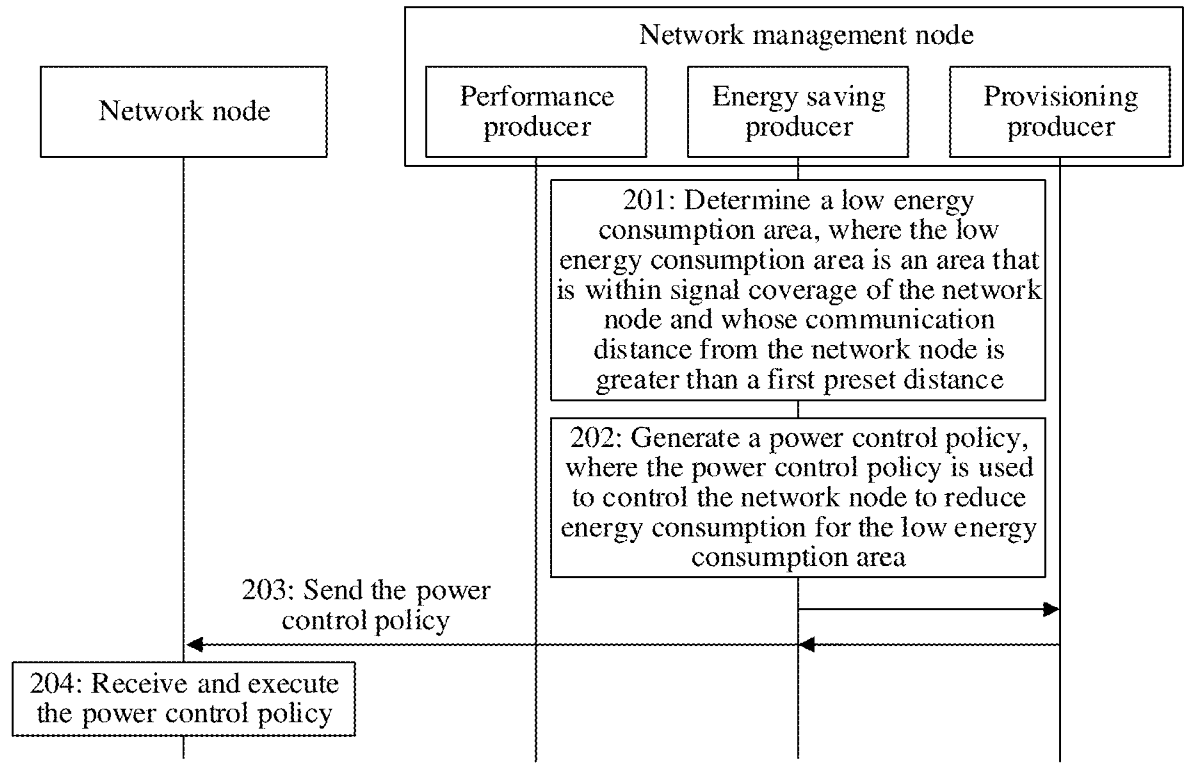
FIG. 3A is a flowchart of a downlink power control method according to at least one embodiment.
FIG. 3B is a schematic diagram of setting of a first preset distance according to at least one embodiment.

FIG. 3A is a flowchart of a downlink power control method according to at least one embodiment. As shown in FIG. 3A, the method includes the following steps.

201: A network management node determines a low energy consumption area, where the low energy consumption area is an area that is within signal coverage of a network node and whose communication distance from the network node is greater than a first preset distance.

The network management node manages the network node: The network management node generates a power control policy for the network node based on communication information of the network node, so that the network node executes the power control policy, to reduce power consumption in a communication process and achieve an objective of energy saving.

In response to the network node communicating with a terminal device that is within coverage of a cell corresponding to the network node, different terminal devices have different communication distances from the network node, and there exists a path loss of transmit power of the network node. The path loss increases as a distance increases. In response to a terminal device that is farther away from the network node accessing the network node, the transmit power of the network node is higher, and power consumption is larger.

In at least one embodiment, the area that is within the signal coverage of the network node and whose distance from the network node is greater than the first preset distance is determined as the low energy consumption area, and then the corresponding power control policy is configured for the low energy consumption area to reduce energy consumption for the low energy consumption area. In this process, because a communication gain of a single terminal device obtained based on power consumption in the low energy consumption area is the lowest, smaller energy consumption of the terminal device in the low energy consumption area is configured to maximize an energy efficiency gain.

FIG. 3B is a schematic diagram of setting of a first preset distance according to at least one embodiment. As shown in FIG. 3B, a communication range between a network node S1 and a terminal device is an annular area (the annular area is merely an example, or is a fan-shaped area. For example, in response to a directional antenna being used, the communication range is merely a fan-shaped area). The first preset distance is a specific value P, for example, 50 km or 77 km. Alternatively, the first preset distance is a proportion range. For example, the first preset distance is P % of the coverage of the cell corresponding to the network node, and the coverage of the cell is L. For example, the coverage of the cell corresponding to the network node is 0 km to 100 km, and 70% of the coverage of the cell corresponding to the network node is {0 km, 70 km}.

In at least one embodiment, the low energy consumption area far away from the network node is determined, and the power control policy for the low energy consumption area is generated, so that the network node reduces energy consumption for the low energy consumption area. In this way, the energy efficiency gain is maximized by minimizing a load.

In at least one embodiment, the first preset distance is determined based on information related to communication between the network node and the terminal device that is within the signal coverage of the network node. Therefore, refer to FIG. 3C, the method in at least one embodiment further includes the following steps.

205: The network node sends information related to first communication between the network node and at least one terminal device to the network management node. The at least one terminal device is a terminal device that receives a downlink signal of the network node.

206: The network management node determines a communication distance between the network node and the at least one terminal device based on the information related to the communication between the network node and the at least one terminal device, and determines the first preset distance based on the communication distance.

The communication between the network node and the terminal device is a dynamic process, and the terminal device that accesses the network node also changes. Therefore, the first preset distance is related to the communication distance between the network node and the terminal device, and is also related to the terminal device that accesses the network node. For example, in a first time period, a maximum communication distance between the terminal device that accesses the network node and the network node is L1, and a correspondingly set first preset distance is 70%×L1. In a second time period, a maximum communication distance between the terminal device that accesses the network node and the network node is L2, and a correspondingly set first preset distance is 70%×L2. The two first preset distances are different.

Specifically, the first preset distance is determined based on the information related to the first communication between the network node and the at least one terminal device. The at least one terminal device is the terminal device that receives the downlink signal of the network node, that is, a UE that communicates with the network node. In the following description, the terminal device is at least one terminal device that communicates with the network node. As described in the foregoing content, the communication between the network node and the terminal device is a dynamic change process. Therefore, the UE that communicates with the network node is a UE that communicates with the network node in a preset time period. The preset time period is one hour, five hours, one day, or the like.

The information related to the first communication is sent by the network node to the network management node, and is specifically sent to a performance producer in the network management node, and then sent by the performance producer to an energy saving producer. The network node periodically sends the foregoing information to the network management node, or sends the information aperiodically, that is, sends the information in response to receiving an indication to send the information. This is not limited in at least one embodiment.

The information related to the first communication is a timing advance (timing advance, TA) of the terminal device that communicates with the network node, first positioning (positioning) information of the terminal device, terminal measurement information for communication between the terminal device and the network node, or the like The TA is a timing offset that is between the UE and the network node and that is measured by the network node after the UE sends a preamble (preamble) to the network node or in response to the UE is resynchronized with the network node. As long as the UE accesses the network node, the network node periodically or aperiodically updates TA information. The unit of the TA measured on the network node side is Ts. 1 Ts=4.89 m (m). To reduce overheads of information sending, the network node sends the timing offset TA to the UE in a basic unit of 16 Ts, that is, the TA obtained by the UE side, where 1 TA=16×4.89=78.24 m. The TA on the network node side represents a delay of communication between the UE and the network node, that is, a relative distance between the UE and the network node. The relative distance between the UE and the network node is nTA, where n is an integer greater than or equal to 1. Therefore, the distance between the network node and the first UE is calculated based on the TA value measured on the network node side. For example, in response to the TA measured by the network node being 100 Ts, the corresponding distance is 100×4.89 m=489 m. At least one embodiment preferentially uses a TA measured by the network node, instead of a TA sent by the network node to the UE, to improve positioning accuracy.

After measuring the TA, the network node sends the TA to the network management node, so that the network management node calculates the relative distance between the network node and the UE based on the TA. The relative distance is a communication distance between the network node and the UE.

The terminal measurement information for communication between the terminal device and the network node includes reference signal received power (reference signal received power, RSRP), reference signal received quality (reference signal received quality, RSRQ), a signal-to-interference-plus-noise ratio (signal-to-interference-plus-noise ratio, SINR), and/or positioning information of the terminal device. The RSRP, the RSRQ, and the SINR are all related to signal strength, and therefore are also referred to as signal strength-related information. The positioning information of the terminal device corresponding to the terminal measurement information is global positioning system (Global Positioning System, GPS) positioning information. In addition, the positioning information further includes positioning information of another terminal device, for example, an uplink time difference of arrival (Uplink Time Difference Of Arrival, UTDOA). These pieces of information do not belong to the terminal measurement information. To distinguish between the two types of positioning information of the terminal device, the first type is referred to as first positioning information, and the second type is referred to as second positioning information.

In response to the information related to the first communication being the signal strength-related information, the network management node determines the communication signal strength between the network node and the terminal device based on the signal strength-related information, and determine the communication distance between the network node and the terminal device based on the communication signal strength. In response to there being a same channel parameter, the communication signal strength between the network node and the terminal device is inversely proportional to the communication distance of the network node and the terminal device. That is, the higher the communication signal strength, the shorter the communication distance, and the lower the communication signal strength, the longer the communication distance. In response to the channel parameter being determined, the specific communication distance between the network node and the terminal device is determined.

In response to the information related to the first communication being the positioning information, a location of the terminal device is determined based on the positioning information of the terminal device, and a location of the network node is learned, so that the communication distance between the terminal device and the network node is determined. The positioning information herein is the first positioning information or the second positioning information described above, and both the two types of positioning information are used to determine the location of the terminal device.

As described above, the first preset distance is set based on the maximum communication distance between the network node and the UE, where the first preset distance is a percentage value of the maximum communication distance; or the first preset distance is set based on an average value of communication distances between the network node and the UE, where the first preset distance is greater than the average value of communication distances; or the like.

In at least one embodiment, the communication distance between the network node and the terminal device is determined by obtaining the information related to the first communication between the network node and the terminal device, and then the low energy consumption area far away from the network node is determined based on the communication distance, so that the determined low energy consumption area is better targeted in a real-time manner, and the generated power control policy maximizes an energy efficiency gain through power control of the network node.

Figure 3C:
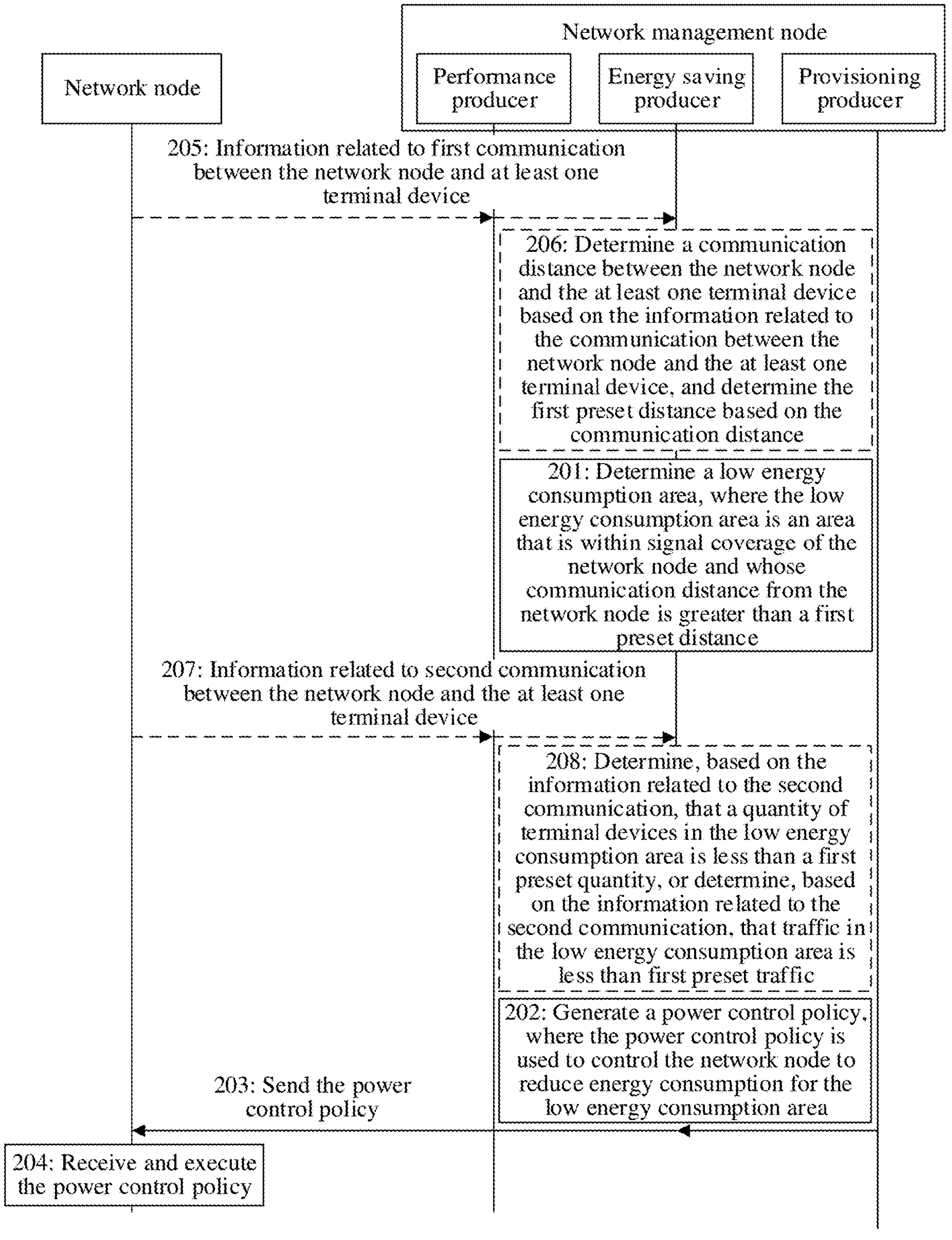
FIG. 3C is a flowchart of another downlink power control method according to at least one embodiment.

Optionally, before the power control policy is generated, refer to FIG. 3C, the method further includes the following steps.

207: The network node sends information related to second communication between the network node and the at least one terminal device to the network management node.

208: The network management node determines, based on the information related to the second communication, that a quantity of terminal devices in the low energy consumption area is less than a first preset quantity, or determines, based on the information related to the second communication, that traffic in the low energy consumption area is less than first preset traffic.

In at least one embodiment, in addition to meeting a condition that the distance between the low energy consumption area and the network node is greater than the first preset distance, the low energy consumption area is determined to meet another condition. For example, the quantity of terminals included in the low energy consumption area is less than the first preset quantity, or the traffic in the low energy consumption area is less than the first preset traffic, where the traffic indicates efficiency of data transmission between the network node and the terminal device. In this way, in addition to meeting a condition that the low energy consumption area is far away from the network node, the low energy consumption area also meets another condition that the quantity of terminals in the area is small or the traffic in the area is light. Therefore, during setting of the power control policy for the low energy consumption area, a bad impact is brought on communication of as few terminal devices as possible, or on transmission of as less data as possible.

Specifically, the information related to the second communication includes first positioning information of the at least one terminal device, or terminal measurement information for communication between the at least one terminal device and the network node, or the information related to the second communication further includes throughput information of the at least one terminal device.

Same as the foregoing description, the terminal measurement information includes the signal strength-related information such as the RSRP, the RSRQ, and the SINR, and further includes second positioning information. The signal strength-related information is used to determine the communication distance between the terminal device and the network node. The communication distance between the terminal device and the network node is also determined based on the second positioning information and the first positioning information. In this case, after the communication distances between the network node and all terminal devices that communicate with the network node are determined, the quantity of terminal devices in the low energy consumption area is determined. Further, whether the quantity of terminal devices is less than the first preset quantity is determined. The first preset quantity is an absolute value, for example, 3, 5, or 10, and alternatively is a proportion value, for example, 10% or 30%, of all the terminal devices that communicate with the network node.

Figure 3D:
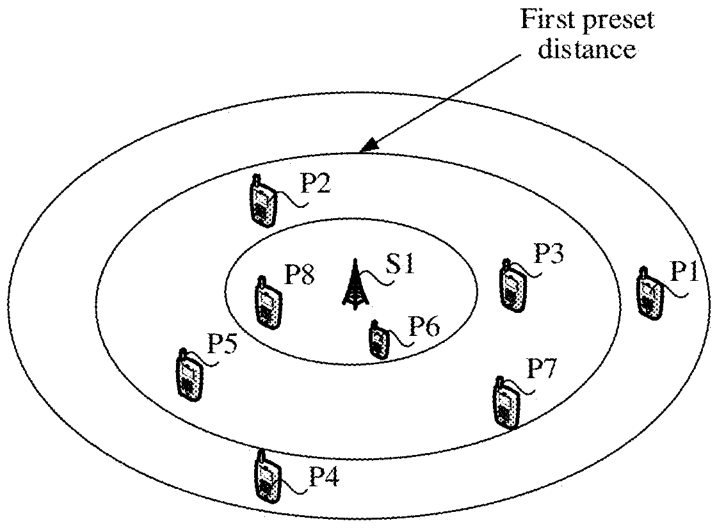
FIG. 3D is a schematic diagram of a quantity distribution of terminal devices according to at least one embodiment.

FIG. 3D is a schematic diagram of a quantity distribution of terminal devices according to at least one embodiment. As shown in FIG. 3D, after the communication distances between all the terminal devices and the network node are determined, a terminal device P1 and a terminal device P4 are located in the low energy consumption area. The first preset quantity is 30% of terminal devices that are within the coverage of the cell corresponding to the network node. However, a quantity of terminal devices that are within coverage of a cell corresponding to the network node S1 is 8, and 8×30%=2.4>2. Therefore, the quantity of terminal devices in the low energy consumption area is less than the first preset quantity, and the power control policy for the terminal device in the low energy consumption area is set.

Optionally, the information related to the second communication further includes throughput information of the terminal device.

In response to the traffic distributed in the low energy consumption area being excessively heavy, access by too many terminal devices that transmit a large amount of data is negatively impacted by reducing energy consumption for the low energy consumption area. To control this impact, the power control policy for the terminal device in the low energy consumption area is generated on a premise that the corresponding traffic distributed in the low energy consumption area is first determined to be less than the first preset traffic.

The first preset traffic is an absolute value, for example, 3 Mbit/s (Megabits per second) or 1 Gbit/s (Gigabits per second), or is a proportion value, for example, 10%, 11%, or 20% of the traffic in the coverage of the cell corresponding to the network node. The traffic of the cell is a sum of throughputs of terminal devices that communicate with the network node. Therefore, the terminal device located in the low energy consumption area is first determined based on the communication distance that is between the network node and the terminal device and that is determined based on the terminal measurement information, the positioning information of the terminal, or the like. Assuming that the first preset traffic is a preset absolute value, the throughputs of the terminal devices in the low energy consumption area are obtained and summed, to determine whether the sum value is less than the preset absolute value. Assuming that the first preset traffic is a preset proportion value, throughput information of all terminal devices that are within the coverage of the cell is obtained and summed, and then the throughputs of the terminal devices in the low energy consumption area are obtained and summed, to determine whether a ratio between the two sum values is less than the preset proportion value.

From the foregoing description, the information related to the first communication and the information related to the second communication are a same type of information. For example, in response to both being the RSRP, the network management node determines, based on the RSRP, the low energy consumption area whose communication distance from the network node is greater than the first preset distance and a quantity of terminal devices and/or traffic distribution in the low energy consumption area. The information related to the first communication and the information related to the second communication alternatively is different types of information. In this case, the information related to the two types of communication is or is not obtained at the same time. This is not limited in at least one embodiment.

In at least one embodiment, after the low energy consumption area whose communication distance from the network node is greater than the first preset distance is determined, the quantity of terminal devices in the low energy consumption area is less than the first preset quantity, or distributed traffic of terminal devices in the low energy consumption area is determined to be less than the first preset traffic. In this way, in response to the power control policy being configured to control the network node to reduce energy consumption for the low energy consumption area, energy is saved for a case of uneven space load distribution of the cell, while ensuring fewer terminal devices accessing the network node are affected and improving feasibility of energy saving.

202: The network management node generates the power control policy, where the power control policy is used to control the network node to reduce energy consumption for the low energy consumption area.

The network management node generates the power control policy, where the power control policy is used to control the network node to reduce energy consumption for the low energy consumption area. The power control policy is used to reduce energy consumption only for the terminal device in the low energy consumption area, or is used to reduce energy consumption for all the terminal devices that are within the coverage of the cell corresponding to the network node, provided that normal communication between the network node and a terminal device whose communication distance from the network node is less than or equal to the first preset distance is not affected.

Optionally, the power control policy includes: down-regulating transmit power of the network node.

Specifically, energy consumption of the network node is reduced by down-regulating the transmit power of the network node, to achieve an energy saving effect. In addition, as described above, although the signal strength received by the terminal device that is within in the coverage of the cell corresponding to the network node decreases after the transmit power is down-regulated, a terminal device whose communication distance from the network node is less than or equal to the first preset distance is able to still normally access the network node. Only access by a terminal device whose communication distance from the network node is greater than the first preset distance is affected.

To ensure that access by the terminal device whose communication distance from the network node is less than or equal to the first preset distance is not affected, a power adjustment amount is to be further confirmed. Specifically, the power adjustment amount is obtained by conversion based on the communication distance from the network node and a corresponding path loss. Using a line of sight (line of sight, LOS) channel as an example, in response to a frequency of a communication network $f_c$=1.8 G, a path loss calculation formula is as follows:

$$PL = 28.0 + 22\log_{10}(d_{3D}) + 20\log_{10}(f_c) \quad (1)$$

PL represents the path loss, and $d_{3D}$ is the communication distance between the network node and the terminal device. $f_c$ is the frequency of the communication network, and $d_{3D}$ is a maximum communication distance between the network node and the UE. The unit of $d_{3D}$ is m (m).

A coverage radius of the cell corresponding to the network node is L, and an annular radius of the low energy consumption area whose communication distance from the network node is greater than the first preset distance is L1, in response to the maximum communication distance between the network node and the UE being adjusted to L−L1, and the corresponding path loss is PL1 in this case, the adjustment amount of the transmit power of the network node is PL−PL1=22 $\log_{10}$(L)−22 $\log_{10}$(L−L1) (unit: dB). Assuming that L=1000 m and L1=500 m, PL−PL1=7 dB.

In at least one embodiment, the power control policy includes: performing communication link rollback processing on the network node.

The communication link rollback processing is to reduce a quantity of communication links. By performing the communication link rollback processing on the network node, the coverage of the cell corresponding to the network node is shortened. In response to the communication link rollback processing being performed, the operation is ensured to only affect the access by the terminal device whose communication distance from the network node is greater than the first preset distance, and does not affect communication of the terminal device whose communication distance from the network node is less than or equal to the first preset distance.

Figure 3E:
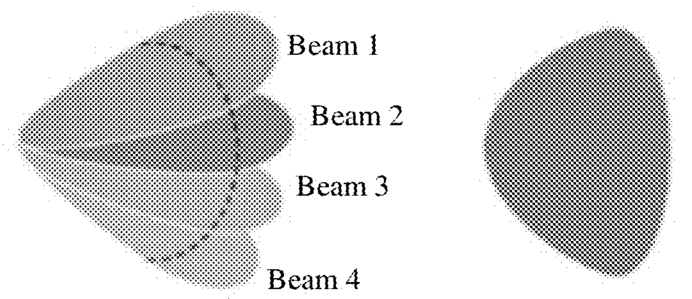
FIG. 3E is a schematic diagram of signal coverage of beams according to at least one embodiment.

FIG. 3E is a schematic diagram of signal coverage of beams according to at least one embodiment. As shown in FIG. 3E, four beams correspond to four transmit links (transmit links) and four receive links (receive links) (4T4R). Two beams correspond to 2T2R. Communication link rollback is performed, that is, 4T4R is rolled back (that is, reduced) to 2T2R. The two beams correspondingly form a wide beam, and coverage of the wide beam is smaller than that of the four beams.

Figure 3F:
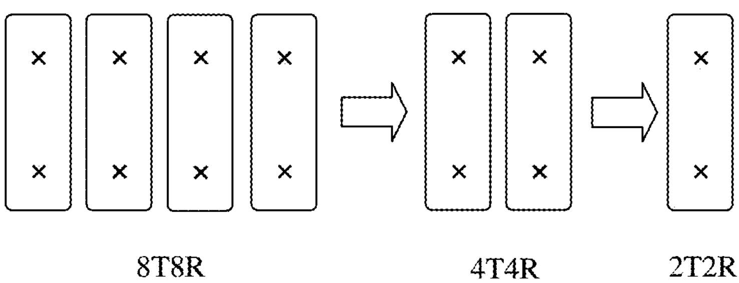
FIG. 3F is a schematic diagram of communication link rollback according to at least one embodiment.

FIG. 3F is a schematic diagram of communication link rollback according to at least one embodiment. As shown in FIG. 3F, 4T4R is rolled back to 2T2R, and a lost beam gain is 3 dB; 8T8R is rolled back to 2T2R, and a lost beam gain is 6 dB.

In this case, in response to the down-regulatable transmit power of the terminal device in the low energy consumption area being calculated based on the foregoing formula and a related process, an optimal post-communication link rollback loss gain is determined, thereby deducing the quantity of communication links that is rolled back. For example, in response to the adjustment amount of the transmit power of the network node being PL−PL1=22 $\log_{10}$(L)−22 $\log_{10}$(L−L1)=5 dB, a policy is formulated to roll back from 4T4R to 2T2R or from 8T8R to 4T4R.

In at least one embodiment, power consumption of the network node is reduced by generating the power control policy to control the network node. In response to the transmit power of the network node being down-regulated, the power control policy is applicable to all terminal devices within the signal coverage of the network node, without affecting communication between the network node and a terminal device that is not in the low energy consumption area. In response to communication link rollback being performed, the power control policy is applicable only to the terminal device in the low energy consumption area, and communication with a terminal device that is not in the low energy consumption area is not affected. Therefore, the power control policy specified in at least one embodiment is used to save energy based on loads of some areas in a cell, to maximize an energy efficiency gain.

203: The network management node sends the power control policy to the network node.

204: The network node receives and executes the power control policy.

After the power control policy is generated, the network management node sends the power control policy to the network node, so that the network node executes the power control policy, to reduce energy consumption and achieve an energy efficiency gain. Specifically, the power control policy is sent to the network node by a provisioning producer in the network management node.

In addition, because location information of the terminal device relative to the network node is statistical information, and the communication distance between the terminal device and the network node changes over time, the terminal device in the low energy consumption area, the quantity of terminal devices in the low energy consumption area, and communication traffic between the terminal device and the network node all change over time. Therefore, the power control policy is time-sensitive, and is specific to the low energy consumption area in a target time period. In addition, there is an association relationship between the target time period and the foregoing preset time period in which the information related to the communication between the network node and the UE is obtained. For example, the target time period is a time period within a specific range after the preset time period, and the specific time range is one hour, three hours, or the like. For example, the preset time period is 8:00-9:00, and the target time period is 9:00-10:00 on a same day. Alternatively, the target time period is a same time period as the preset time period in a cycle. For example, the cycle is one day, the target time period is 8:00-9:00 in the one day, and the preset time period is also 8:00-9:00 in the one day.

Further, according to the foregoing description, in response to the network node executing the power control policy, a process in which the terminal device in the low power consumption area accesses the network node is affected, and even the terminal device in the low power consumption area cannot access the network node. In this case, the terminal device in the low power consumption area is handed over to an auxiliary network node, so as to ensure a communication use of the terminal device in the low power consumption area.

Figure 4:
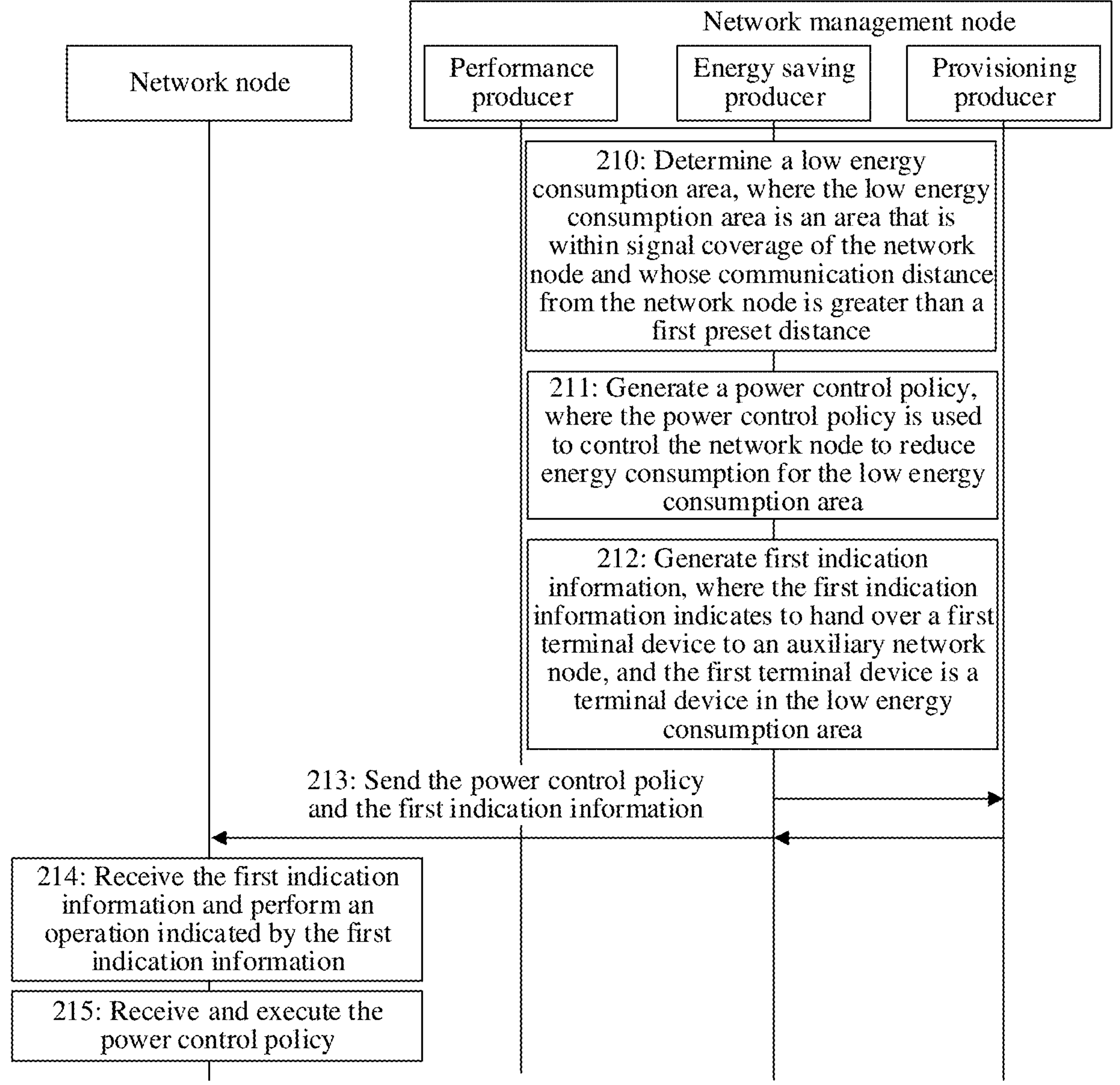
FIG. 4 is a flowchart of another downlink power control method according to at least one embodiment.

FIG. 4 is a flowchart of another downlink power control method according to at least one embodiment. As shown in FIG. 4, the method specifically includes the following steps.

210: A network management node obtains a network node and determines a low energy consumption area, where the low energy consumption area is an area that is within signal coverage of the network node and whose communication distance from the network node is greater than a first preset distance.

211: The network management node generates a power control policy, where the power control policy is used to control the network node to reduce energy consumption for the low energy consumption area.

212: The network management node generates first indication information, where the first indication information indicates to hand over a first terminal device to an auxiliary network node, and the first terminal device is a terminal device in the low energy consumption area.

213: The network management node sends the power control policy and the first indication information to the network node.

214: The network node receives the first indication information and performs an operation indicated by the first indication information.

215: The network node receives and executes the power control policy.

Step 210 and step 211 are the same as step 201 and step 202, and reference is made to corresponding descriptions. In step 212, the used power control policy affects access by terminal devices in the low energy consumption area, and consequently, the terminal devices fail to communicate normally. Based on this, in response to the auxiliary network node existing, the network management node generates the first indication information, to indicate to hand over the first terminal device in the low energy consumption area to the auxiliary network node for communication.

The auxiliary network node is another network node other than the network node that currently performs power control, and the another network node meets a specific condition. For example, the another network node meets the following conditions: Coverage of the another network node overlaps that of the network node, the first terminal device is within coverage of a cell corresponding to the another network node, and a load of the another network node is less than a threshold.

After generating the first indication information, the network management node sends the first indication information to the network node, and the network node sends third indication information to the auxiliary network node based on the first indication information, to indicate the auxiliary network node to reserve an access resource for the first terminal device. In addition, the network node further sends a measurement control message to the first terminal device, so that the first terminal device finds the auxiliary network node based on the measurement control message, and accesses the auxiliary network node.

In at least one embodiment, the first terminal device is handed over between the network node and the auxiliary network node. Specifically, in response to receiving the power control policy, the network node first hands over the first terminal device to the auxiliary network node. Assuming that the power control policy indicates the network node to reduce energy consumption in the preset time period, the first terminal device is handed over back to the network node after the preset time period expires. Alternatively, in response to a load of the auxiliary network node exceeding a threshold, the first terminal device is handed over back to the network node, and the network node interrupts an energy consumption reduction mode. Alternatively, in response to the load of the auxiliary network node exceeding the threshold, the first terminal device is handed over to another auxiliary node. A dedicated wired communication link exists between the network node and the auxiliary network node, and the dedicated wired communication link is used for communication for handover of the first terminal device to a cell to be accessed by the first terminal device.

Step 211 is performed before step 212, step 212 is performed before step 211, or step 211 and step 212 are performed simultaneously. A performing sequence of the two steps is not limited in at least one embodiment. For step 213, the network management node sends the power control policy and the first indication information to the network node at the same time or at different times. A specific sending sequence is not limited.

In at least one embodiment, after the power control policy for the first terminal device in the low energy consumption area is generated, the first indication information is generated to indicate to hand over the first terminal device to the auxiliary network node, so that in response to the network node failing to provide a good communication service for the first terminal device after power consumption reduction, the first terminal device is handed over to another network node for access and communication. This process reduces impact of energy saving of the network node on communication of the terminal device, and ensures communication of the terminal device in the low power consumption area.

Figure 5A:
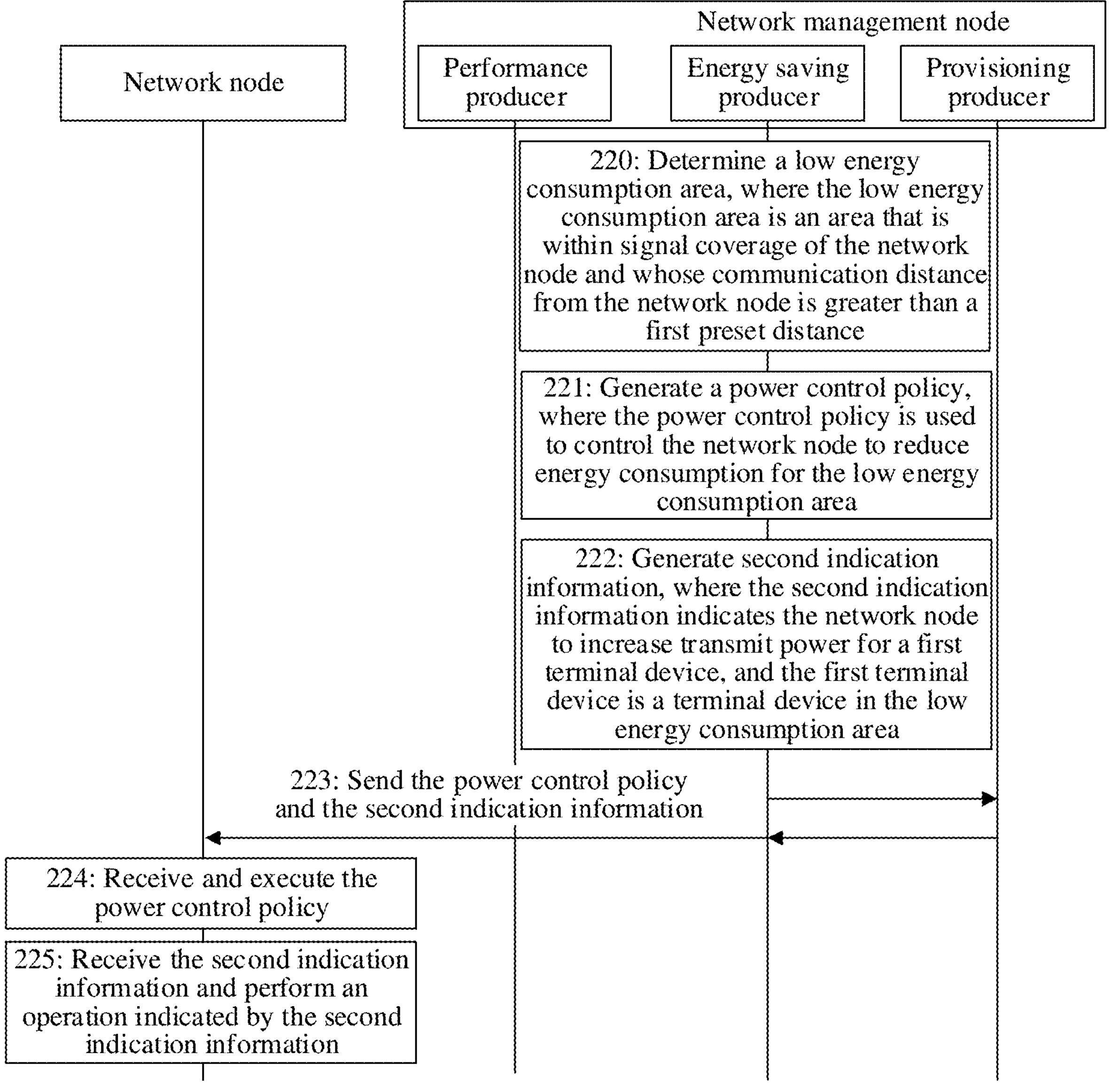
FIG. 5A is a flowchart of another downlink power control method according to at least one embodiment.

Alternatively, in some cases, power aggregation and user-level power control are used to make up for lost coverage of the cell corresponding to the network node, so as to ensure a communication use of the terminal device in the low power consumption area. FIG. 5A is a flowchart of another downlink power control method according to at least one embodiment. As shown in FIG. 5A, the method specifically includes the following steps.

220: A network management node determines a low energy consumption area, where the low energy consumption area is an area that is within the signal coverage of a network node and whose communication distance from the network node is greater than a first preset distance.

221: The network management node generates a power control policy, where the power control policy is used to control the network node to reduce energy consumption for the low energy consumption area.

222: The network management node generates second indication information, where the second indication information indicates the network node to increase transmit power for a first terminal device, and the first terminal device is a terminal device in the low energy consumption area.

223: The network management node sends the power control policy and the second indication information to the network node.

224: The network node receives and executes the power control policy.

225: The network node receives the second indication information and performs an operation indicated by the second indication information.

Step 220 and step 221 are the same as step 201 and step 202, and reference is made to corresponding descriptions. In step 222, the used power control policy affects access by terminal devices in the low energy consumption area, and consequently, the terminal devices fail to communicate normally. Based on this, for the first terminal device in the low energy consumption area, the network management node generates the second indication information, to indicate the network node to increase the transmit power for the first terminal device, that is, ensure access and communication of the first terminal device through power aggregation and user-level power control.

Specifically, power aggregation is mainly to aggregate power of a resource block (resource block, RB) that has no information to be sent in a downlink common channel to an RB that has information to be sent in a common channel, to increase coverage of the common channel, so that the coverage of the common channel is consistent with coverage of an original narrow beam before the communication link rollback.

Figure 5B:
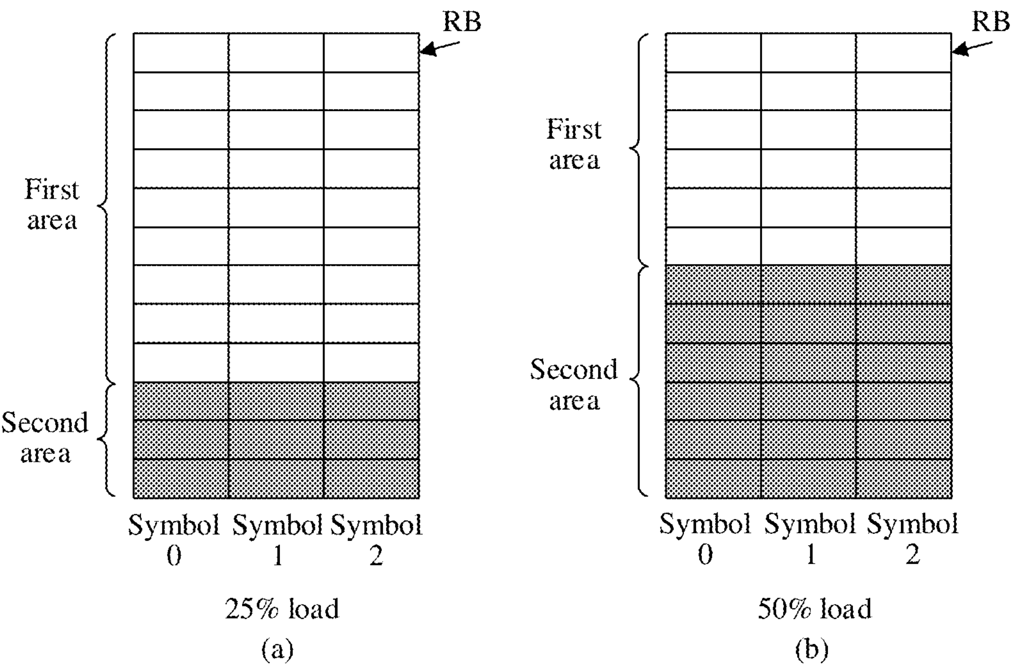
FIG. 5B is a schematic diagram of power aggregation according to at least one embodiment.

FIG. 5B is a schematic diagram of power aggregation according to at least one embodiment. As shown in (a) in FIG. 5B, in response to the load of the cell corresponding to the network node being 25%, and on a frequency domain resource for communication between the network node and the first terminal in the low power consumption area, in a symbol (orthogonal frequency division multiplexing (orthogonal frequency division multiplexing, OFDM) symbol), a first area is an RB that has no signal to be sent, and a second area is an RB that has a signal to be sent, power of RBs in the first area are all aggregated to RBs in the second area, and a gain is 6 dB; or as shown in (b) in FIG. 5B, in response to the load of the cell being 50%, the gain of power aggregation is 3 dB. In response to 4T4R being rolled back to 2T2R, an antenna gain loss is 6 dB. In response to the load of the cell being 25%, the power aggregation gain compensates for the antenna gain loss and ensures control channel coverage.

For a data channel, the transmit power of the network node for a single UE is adjusted through user-level power control. For example, for the UE in the low power consumption area, average power of each RB allocated to the UE is increased, so that the allocated power covers an outer area of the UE, or a quantity of RBs allocated to each UE is increased, so that total power for the UE is increased, to achieve expected coverage. Similarly, for an increase of allocated RBs, a quantity of RBs allocated to the first terminal device in the low power consumption area is twice a quantity of RBs allocated to another terminal device that communicates with the network node (corresponding to a case in which a gain loss is 3 dB), or four times a quantity of RBs allocated to another terminal device that communicates with the network node (corresponding to a case in which a gain loss is 6 dB).

Similarly, step 221 is performed before step 222, step 222 is performed before step 221, or step 221 and step 222 are performed simultaneously. A performing sequence of the two steps is not limited in at least one embodiment. For step 223, the network management node sends the power control policy and the second indication information to the network node at the same time or at different times. A specific sending sequence is not limited.

In at least one embodiment, after the power control policy for the first terminal device in the low energy consumption area is generated, the second indication information is generated to indicate the network node to increase the transmit power for the first terminal device, so that after the coverage of the cell corresponding to the network node is reduced due to use of the power control policy by the network node, power aggregation and user-level power control are used to make up for lost coverage of the cell. This process achieves an energy efficiency gain while ensuring communication of the terminal device in the low energy consumption area.

Figure 6:
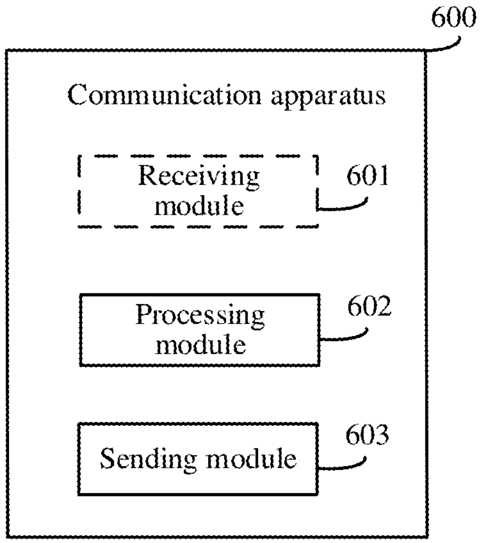
FIG. 6 is a structural block diagram of a communication apparatus according to at least one embodiment.

FIG. 6 shows a communication apparatus 600 according to at least one embodiment. The communication apparatus 600 is configured to perform the methods and specific embodiments performed by the network management node in FIG. 3A to FIG. 3E, FIG. 4, FIG. 5A, and FIG. 5B. In at least one embodiment, as shown in FIG. 6, the apparatus 600 includes a processing module 602 and a sending module 603.

The processing module 602 is configured to determine a low energy consumption area, where the low energy consumption area is an area that is within signal coverage of a network node and whose communication distance from the network node is greater than a first preset distance; and generate a power control policy, where the power control policy is used to control the network node to reduce energy consumption for the low energy consumption area.

The sending module 603 is configured to send the power control policy to the network node.

Optionally, the apparatus further includes a receiving module 601. The receiving module 601 is configured to obtain information related to first communication between the network node and at least one terminal device, where the at least one terminal device is a terminal device that receives a downlink signal of the network node. The processing module 602 is further configured to determine a communication distance between the network node and the at least one terminal device based on the information related to the first communication between the network node and at least one terminal device, and determine the first preset distance based on the communication distance between the network node and the at least one terminal device.

Optionally, the information related to the first communication includes a timing advance TA of a terminal device that communicates with the network node, first positioning information of the terminal device, or terminal measurement information for communication between the terminal device and the network node. The terminal measurement information includes reference signal received power RSRP, reference signal received quality RSRQ, a signal-to-interference-plus-noise ratio SINR, and/or second positioning information of the terminal device.

Optionally, the processing module 602 is specifically configured to determine a relative distance between the network node and the terminal device based on the TA of the terminal device that communicates with the network node, and determine the communication distance between the network node and the terminal device based on the relative distance; or determine communication signal strength between the network node and the terminal device based on signal strength-related information in the terminal measurement information for communication between the terminal device and the network node, and determine the communication distance between the network node and the terminal device based on the communication signal strength, where the signal strength-related information includes the RSRP, the RSRQ, and/or the SINR; or determine a location of the terminal device based on positioning information of the terminal device, and determine the communication distance between the terminal device and the network node based on the location of the terminal device, where the positioning information includes the first positioning information or the second positioning information.

In an optional example, the apparatus further includes the receiving module 601. The receiving module 601 is configured to obtain information related to second communication between the network node and at least one terminal device. The processing module 602 is further configured to determine, based on the information related to the second communication, that a quantity of terminal devices in the low energy consumption area is less than a first preset quantity, or determine, based on the information related to the second communication, that traffic in the low energy consumption area is less than first preset traffic.

Optionally, the information related to the second communication includes first positioning information of the at least one terminal device, or terminal measurement information for communication between the at least one terminal device and the network node, or the information related to the second communication further includes throughput information of the at least one terminal device.

Optionally, the processing module 602 is specifically configured to determine a location of the at least one terminal device based on the first positioning information of the at least one terminal device or the terminal measurement information for communication between the at least one terminal device and the network node, and determine, based on the location of the at least one terminal device, whether the quantity of terminal devices in the low energy consumption area is less than the first preset quantity.

Alternatively, the processing module 602 is specifically configured to determine a location of the at least one terminal device based on the first positioning information of the at least one terminal device or the terminal measurement information for communication between the at least one terminal device and the network node, and determine, based on the throughput of the at least one terminal device, whether the quantity of terminal devices in the low energy consumption area is less than the first preset traffic.

Optionally, the low energy consumption area is a low energy consumption area in a target time period, and that the power control policy is used to control the network node to reduce energy consumption for the low energy consumption area includes: The power control policy is used to control the network node to reduce energy consumption for the low energy consumption area in the target time period.

Optionally, the processing module 602 is further configured to generate first indication information, where the first indication information indicates to hand over a first terminal device to an auxiliary network node, and the first terminal device is a terminal device in the low energy consumption area. The sending module 603 is further configured to send the first indication information to the network node.

Optionally, the processing module 602 is further configured to generate second indication information, where the second indication information indicates the network node to increase transmit power for a first terminal device, and the first terminal device is a terminal device in the low energy consumption area. The sending module 603 is further configured to send the second indication information to the network node.

Optionally, the increasing transmit power for a first terminal device includes: increasing a quantity of resource blocks allocated to the first terminal device and/or increasing resource block power allocated to the first terminal device.

Optionally, the signal coverage of the network node includes signal coverage of a cell corresponding to the network node.

Optionally, the processing module 602 is a central processing unit (Central Processing Unit, CPU).

Optionally, the sending module 603 and the receiving module 601 is an interface circuit or a transceiver, configured to receive data or instructions from another electronic apparatus or send the data or instructions.

Optionally, the communication apparatus 600 further includes a storage module (not shown in the figure). The storage module is configured to store data and/or signaling, and the storage module is coupled to the receiving module 601, the sending module 603, and the processing module 602. For example, the processing module 602 is configured to read the data and/or signaling in the storage module, so that the channel processing process in the foregoing method embodiment is performed.

Figure 7:
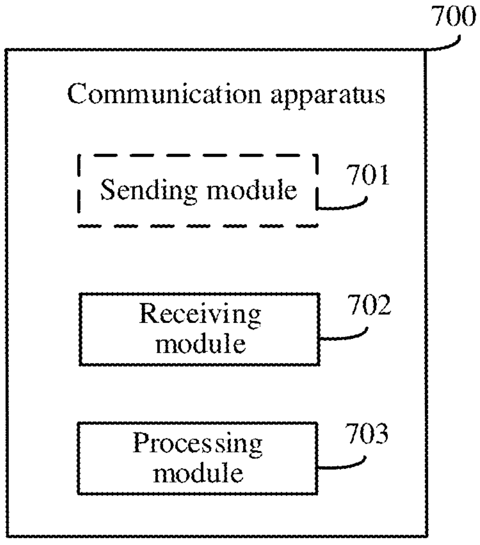
FIG. 7 is a structural block diagram of a communication apparatus according to at least one embodiment.

FIG. 7 shows a communication apparatus 700 according to at least one embodiment. The communication apparatus 700 is configured to perform the methods and specific embodiments performed by the network node in FIG. 3A to FIG. 3E, FIG. 4, FIG. 5A, and FIG. 5B. In at least one embodiment, as shown in FIG. 7, the apparatus 700 includes a receiving module 702 and a processing module 703.

The receiving module 702 is configured to receive a power control policy, where the power control policy is used to control a network node to reduce energy consumption for a low energy consumption area, and the low energy consumption area is an area that is within signal coverage of the network node and whose communication distance from the network node is greater than a first preset distance.

The processing module 703 is configured to execute the power control policy.

Optionally, the apparatus further includes a sending module 701, configured to:

send information related to first communication between the network node and at least one terminal device to a network management node, where the at least one terminal device is a terminal device that receives a downlink signal of the network node, and the information related to the first communication is used by the network management node to determine the first preset distance.

Optionally, the information related to the first communication includes a timing advance TA of a terminal device that communicates with the network node, first positioning information of the terminal device, or terminal measurement information for communication between the terminal device and the network node. The terminal measurement information includes reference signal received power RSRP, reference signal received quality RSRQ, a signal-to-interference-plus-noise ratio SINR, and/or second positioning information of the terminal device.

Optionally, the apparatus further includes the sending module 701, configured to send information related to second communication between the network node and at least one terminal device to the network management node, where the information related to the second communication is used by the network management node to determine that a quantity of terminal devices in the low energy consumption area is less than a first preset quantity, or determine that traffic in the low energy consumption area is less than first preset traffic.

Optionally, the information related to the second communication includes first positioning information of the at least one terminal device, or terminal measurement information for communication between the at least one terminal device and the network node, or the information related to the second communication further includes throughput information of the at least one terminal device.

Optionally, the power control policy includes: down-regulating transmit power of the network node.

Optionally, the power control policy includes: performing communication link rollback processing on the network node.

Optionally, the receiving module 702 is further configured to receive first indication information, where the first indication information indicates to hand over a first terminal device to an auxiliary network node. The processing module 703 is further configured to execute the first indication information.

Optionally, the receiving module 702 is further configured to receive second indication information, where the second indication information indicates the network node to increase transmit power for a first terminal device. The processing module 703 is further configured to execute the second indication information.

Optionally, the increasing transmit power for a first terminal device includes: increasing a quantity of resource blocks allocated to the first terminal device and/or increasing resource block power allocated to the first terminal device.

Optionally, the processing module 703 is a central processing unit (Central Processing Unit, CPU).

Optionally, the receiving module 702 and the sending module 701 is an interface circuit or a transceiver, configured to receive data or signaling from another electronic device or send the data or signaling.

Optionally, the communication apparatus 700 further includes a storage module (not shown in the figure). The storage module is configured to store data and/or signaling, and the storage module is coupled to the receiving module 702, the sending module 701, and the processing module 703.

Figure 8:
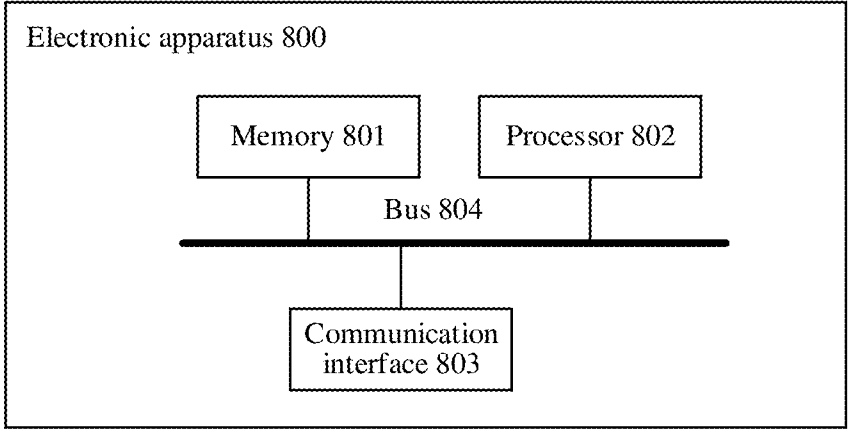
FIG. 8 is a schematic diagram of a structure of an electronic apparatus according to at least one embodiment.

FIG. 8 is a schematic diagram of a hardware structure of an electronic apparatus according to at least one embodiment. For structures of the communication apparatus 600 and the communication apparatus 700, refer to the structure shown in FIG. 8. An electronic apparatus 800 includes a memory 801, a processor 802, a communication interface 803, and a bus 804. The memory 801, the processor 802, and the communication interface 803 implement communication connection among one another through the bus 804.

The memory 801 is a read-only memory (Read-Only Memory, ROM), a static storage device, a dynamic storage device, or a random access memory (Random Access Memory, RAM). The memory 801 stores a program. In response to the program stored in the memory 801 being executed by the processor 802, the processor 802 and the communication interface 803 are configured to perform steps of the distributed rendering method in at least one embodiment.

The processor 802 is a general-purpose CPU, a microprocessor, an application-specific integrated circuit (Application-Specific Integrated Circuit, ASIC), a GPU, or one or more integrated circuits, and is configured to execute a related program, to implement functions that are to be executed by the receiving module 601, the processing module 602, and the sending module 603 in the communication apparatus 600 in at least one embodiment, or implement functions that are to be executed by the sending module 701, the receiving module 702, and the processing module 703 in the communication apparatus 700, or perform the downlink power control method in the method embodiments described herein.

The processor 802 is alternatively an integrated circuit chip and has a signal processing capability. In an implementation process, the steps of the distributed rendering method in at least one embodiment are completed through an integrated logic circuit in a form of hardware in the processor 802, or instructions in a form of software. The processor 802 is alternatively a general-purpose processor, a digital signal processor (Digital Signal Processor, DSP), an application-specific integrated circuit (ASIC), a field programmable gate array (Field Programmable Gate Array, FPGA) or another programmable logical device, a discrete gate or transistor logic device, or a discrete hardware component. The processor 802 implements or performs the methods, the steps, and logical block diagrams that are disclosed in at least one embodiment. The general-purpose processor is a microprocessor, or the processor is any conventional processor or the like. Steps of the methods disclosed with reference to embodiments described herein is directly executed and accomplished by a hardware decoding processor, or is executed and accomplished by a combination of hardware and software modules in the decoding processor. A software module is located in a mature storage medium in the art, such as a random access memory, a flash memory, a read-only memory, a programmable read-only memory, an electrically erasable programmable memory, or a register. The storage medium is located in the memory 801. The processor 802 reads information in the memory 801, and completes, in combination with hardware of the processor, functions that are to be executed by modules in the communication apparatus 600 or the communication apparatus 700 in at least one embodiment, or performs the downlink power control method in the method embodiments described herein.

The communication interface 803 uses a transceiver apparatus, including but not limited to a transceiver, to implement communication between the electronic apparatus 800 and another device or a communication network. For example, a determined segmentation target and/or a candidate target bounding box is obtained through the communication interface 803. The bus 804 is included in a channel for information transmission among various components of the electronic apparatus 800 (for example, the memory 801, the processor 802, and the communication interface 803).

Although the electronic apparatus 800 shown in FIG. 8 only presents the memory, the processor, and the communication interface, in a specific implementation process, a person skilled in the art should understand that the electronic apparatus 800 further includes another component used for implementing normal operation. In addition, according to a specific usage, a person skilled in the art should understand that the electronic apparatus 800 further includes a hardware device that implements another additional function. In addition, a person skilled in the art should understand that the electronic apparatus 800 includes only a component for implementing at least one embodiment, and is able to not include all the components shown in FIG. 8.

At least one embodiment further provides a communication system. The communication system includes a first communication apparatus and a second communication apparatus. The first communication apparatus is configured to perform the methods performed by the network management node in FIG. 3A to FIG. 3E, FIG. 4, FIG. 5A, and FIG. 5B. The second communication apparatus is configured to perform the methods performed by the network node in FIG. 3A to FIG. 3E, FIG. 4, FIG. 5A, and FIG. 5B.

In addition, at least one embodiment further provides a computer program. The computer program is used to implement an operation and/or processing performed by the first communication apparatus in the method provided in at least one embodiment.

At least one embodiment further provides a computer program. The computer program is used to implement an operation and/or processing performed by the second communication apparatus in the method provided in at least one embodiment.

At least one embodiment further provides a computer-readable storage medium. The computer-readable storage medium stores a computer program or computer-executable instructions. In response to the computer program or the computer-executable instructions being run on a computer, the computer is enabled to perform an operation and/or processing performed by the first communication apparatus in the method provided in at least one embodiment.

At least one embodiment further provides a computer-readable storage medium. The computer-readable storage medium stores a computer program or computer-executable instructions. In response to the computer program or the computer-executable instructions being run on a computer, the computer is enabled to perform an operation and/or processing performed by the second communication apparatus in the method provided in at least one embodiment.

At least one embodiment further provides a computer program product. The computer program product includes computer-executable instructions or a computer program. In response to the computer-executable instructions or the computer program being run on a computer, an operation and/or processing performed by the first communication apparatus in the method provided in at least one embodiment is enabled to be performed.

At least one embodiment further provides a computer program product. The computer program product includes computer-executable instructions or a computer program. In response to the computer-executable instructions or the computer program being run on a computer, an operation and/or processing performed by the second communication apparatus in the method provided in at least one embodiment is enabled to be performed.

Sequence numbers of the foregoing processes do not mean execution sequences in at least one embodiment. The execution sequences of the processes should be determined based on functions and internal logic of the processes, and should not be construed as any limitation on the implementation processes of at least one embodiment.

A person of ordinary skill in the art is aware that, in combination with the examples described in embodiments disclosed herein, modules and algorithm steps is implemented by electronic hardware or a combination of computer software and electronic hardware. Whether the functions are performed by hardware or software depends on particular applications and design constraint conditions of the technical solutions. A person skilled in the art is able to use different methods to implement the described functions for each particular application, but the implementation does not go beyond the scope of embodiments described herein.

A person skilled in the art understands that, for the purpose of convenient and brief description, for a detailed working process of the foregoing system, apparatus, and module, refer to a corresponding process in the foregoing method embodiments, and details are not described herein again.

In at least one embodiment, the disclosed system, apparatus, and method are implemented in other manners. For example, the described apparatus embodiment is merely an example. For example, division into the modules is merely logical function division. There is another division manner during actual implementation. For example, a plurality of modules or components are combined or integrated into another system, or some features are ignored or not performed. In addition, the displayed or discussed mutual couplings or direct couplings or communication connections are implemented by using some interfaces. The indirect couplings or communication connections between the apparatuses or modules are implemented in electronic, mechanical, or other forms.

The modules described as separate parts may or may not be physically separate, and parts displayed as modules may or may not be physical modules, are located in one position, or are distributed on a plurality of network modules. Some or all the modules are selected based on actual usage to achieve the objectives of the solutions of embodiments.

In addition, functional modules in at least one embodiment are integrated into one processing module, or each of the modules exist alone physically, or two or more modules are integrated into one module.

In response to the functions being implemented in the form of a software functional module and sold or used as an independent product, the functions are stored in a computer-readable storage medium. Based on such an understanding, the technical solutions of at least one embodiment essentially, or the part contributing to the prior art, or some of the technical solutions are implemented in a form of a software product. The computer software product is stored in a storage medium, and includes several instructions for enabling a computer device (such as a personal computer, a server, or a network device) to perform all or some of the steps of the methods described in at least one embodiment. The foregoing storage medium includes: any medium that stores program code, such as a USB flash drive, a removable hard disk, a read-only memory (read-only memory, ROM), a random access memory (random access memory, RAM), a magnetic disk, or an optical disc.

What is claimed is:

1. A downlink power control method, applied to a network management node, wherein the method comprises:

determining a low energy consumption area, wherein the low energy consumption area is an area that is within signal coverage of a network node and whose communication distance from the network node is greater than a first preset distance;

generating a power control policy, wherein the power control policy is usable to control the network node to reduce energy consumption for the low energy consumption area; and sending the power control policy to the network node.

2. The method according to claim 1, wherein before the determining a low energy consumption area, the method further comprises:

obtaining information related to first communication between the network node and at least one terminal device, wherein the at least one terminal device is a terminal device that receives a downlink signal of the network node;

determining a communication distance between the network node and the at least one terminal device based on the information related to the communication between the network node and the at least one terminal device; and determining the first preset distance based on the communication distance between the network node and the at least one terminal device.

3. The method according to claim 2, wherein the obtaining the information related to the first communication includes obtaining a timing advance TA of a terminal device that communicates with the network node, first positioning information of the terminal device, or terminal measurement information for communication between the terminal device and the network node; and the terminal measurement information includes: reference signal received power RSRP, reference signal received quality RSRQ, a signal-to-interference-plus-noise ratio SINR, and/or second positioning information of the terminal device.

4. The method according to claim 3, wherein the determining a communication distance between the network node and the at least one terminal device based on the information related to the communication between the network node and the at least one terminal device includes:

determining a relative distance between the network node and the terminal device based on the TA of the terminal device that communicates with the network node, and determining the communication distance between the network node and the terminal device based on the relative distance; or determining communication signal strength between the network node and the terminal device based on signal strength-related information in the terminal measurement information for communication between the terminal device and the network node, and determining the communication distance between the network node and the terminal device based on the communication signal strength, wherein the signal strength-related information includes the RSRP, the RSRQ, and/or the SINR; or determining a location of the terminal device based on positioning information of the terminal device, and determining the communication distance between the terminal device and the network node based on the location of the terminal device, wherein the positioning information includes the first positioning information or the second positioning information.

5. The method according to claim 1, wherein before the generating a power control policy, the method further comprises:

obtaining information related to communication between the network node and at least one terminal device; and determining, based on the information related to the communication, that a quantity of terminal devices in the low energy consumption area is less than a first preset quantity, or determining, based on the information related to the communication, that traffic in the low energy consumption area is less than first preset traffic.

6. The method according to claim 5, wherein the obtaining the information related to the communication includes obtaining:

first positioning information of the at least one terminal device; or terminal measurement information for communication between the at least one terminal device and the network node; or the information related to the communication further includes throughput information of the at least one terminal device.

7. The method according to claim 6, wherein the determining, based on the information related to the communication, that a quantity of terminal devices in the low energy consumption area is less than a first preset quantity includes:

determining a location of the at least one terminal device based on the first positioning information of the at least one terminal device or the terminal measurement information for communication between the at least one terminal device and the network node, and determining, based on the location of the at least one terminal device, whether the quantity of terminal devices in the low energy consumption area is less than the first preset quantity; and the determining, based on the information related to the communication between the network node and the at least one terminal device, that traffic in the low energy consumption area is less than first preset traffic includes:

determining the location of the at least one terminal device based on the first positioning information of the at least one terminal device or the terminal measurement information for communication between the at least one terminal device and the network node; and determining, based on a throughput of the at least one terminal device, whether traffic of the terminal device in the low energy consumption area is less than the first preset traffic.

8. The method according to claim 1, wherein the determining the low energy consumption area includes determining a low energy consumption area in a target time period, and that the power control policy is used to control the network node to reduce energy consumption for the low energy consumption area includes: the power control policy is used to control the network node to reduce energy consumption for the low energy consumption area in the target time period.

9. The method according to claim 1, wherein the generating the power control policy includes: down-regulating transmit power of the network node, or performing communication link rollback processing on the network node.

10. The method according to claim 1, wherein the method further comprises:

generating first indication information, wherein the first indication information indicates to hand over a first terminal device to an auxiliary network node, and the first terminal device is a terminal device in the low energy consumption area; and sending the first indication information to the network node.

11. The method according to claim 1, wherein the method further comprises:

generating indication information, wherein the indication information indicates the network node to increase transmit power for a first terminal device, and the first terminal device is a terminal device in the low energy consumption area; and sending the indication information to the network node.

12. The method according to claim 1, wherein the determining the low energy consumption area is an area that is within the signal coverage of the network node includes determining signal coverage of a cell corresponding to the network node.

13. A downlink power control method, applied to a network node, wherein the method comprises:

receiving a power control policy, wherein the power control policy is usable to control the network node to reduce energy consumption for a low energy consumption area, and the low energy consumption area is an area that is within signal coverage of the network node and whose communication distance from the network node is greater than a first preset distance; and executing the power control policy.

14. The method according to claim 13, wherein before the receiving a power control policy, the method further comprises: sending information related to first communication between the network node and at least one terminal device to a network management node, wherein the at least one terminal device is a terminal device that receives a downlink signal of the network node, and the information related to the first communication is used by the network management node to determine the first preset distance.

15. The method according to claim 14, wherein the sending the information related to the first communication includes sending a timing advance TA of a terminal device that communicates with the network node, first positioning information of the terminal device, or terminal measurement information for communication between the terminal device and the network node;

wherein the terminal measurement information includes: reference signal received power RSRP, reference signal received quality RSRQ, a signal-to-interference-plus-noise ratio SINR, and/or second positioning information of the terminal device.

16. The method according to claim 13, wherein before the receiving a power control policy, the method further comprises: sending information related to communication between the network node and at least one terminal device to a network management node, wherein the information related to the communication is used by the network management node to determine that a quantity of terminal devices in the low energy consumption area is less than a first preset quantity, or determine that traffic in the low energy consumption area is less than first preset traffic.

17. The method according to claim 13, wherein the method further comprises:

receiving first indication information, wherein the first indication information indicates to hand over a first terminal device to an auxiliary network node; and performing an operation indicated by the first indication information.

18. The method according to claim 13, wherein the method further comprises:

receiving indication information, wherein the indication information indicates the network node to increase transmit power for a first terminal device; and performing an operation indicated by the indication information.

19. A communication apparatus, comprising:

a processor, wherein the processor is configured to execute a stored computer program to perform operations for:

determining a low energy consumption area, wherein the low energy consumption area is an area that is within signal coverage of a network node and whose communication distance from the network node is greater than a first preset distance;

generating a power control policy, wherein the power control policy is usable to control the network node to reduce energy consumption for the low energy consumption area; and sending the power control policy to the network node.

* * * * *